(12) United States Patent
Sliger et al.

(10) Patent No.: US 10,174,856 B2
(45) Date of Patent: Jan. 8, 2019

(54) MAIN VALVE WITH GROOVED RIGID INTERNAL STRUCTURE

(71) Applicant: Mueller International, LLC, Atlanta, GA (US)

(72) Inventors: Matthew Sliger, Chattanooga, TN (US); Paul Gifford, Chattanooga, TN (US); Steve Fearnow, Cleveland, TN (US)

(73) Assignee: Mueller International, LLC, Atlanta, GA (US)

( * ) Notice: Subject to any disclaimer, the term of this patent is extended or adjusted under 35 U.S.C. 154(b) by 342 days.

(21) Appl. No.: 15/281,565

(22) Filed: Sep. 30, 2016

(65) Prior Publication Data

US 2017/0016550 A1    Jan. 19, 2017

Related U.S. Application Data

(62) Division of application No. 14/615,971, filed on Feb. 6, 2015, now Pat. No. 9,664,297.

(51) Int. Cl.
| | |
|---|---|
| *F16K 27/00* | (2006.01) |
| *E03B 9/02* | (2006.01) |
| *E03B 9/04* | (2006.01) |
| *B29C 45/14* | (2006.01) |
| *B29C 45/36* | (2006.01) |

(Continued)

(52) U.S. Cl.
CPC ...... *F16K 27/006* (2013.01); *B29C 45/14065* (2013.01); *B29C 45/14819* (2013.01); *B29C 45/36* (2013.01); *E03B 9/02* (2013.01); *E03B 9/04* (2013.01); *E03B 9/06* (2013.01); *B29C 2045/14147* (2013.01); *B29K 2009/06* (2013.01); *B29K 2105/20* (2013.01); *B29L 2031/7506* (2013.01); *F16K 1/36* (2013.01); *Y10T 137/5327* (2015.04)

(58) Field of Classification Search
CPC ... F16K 27/006; E03B 9/02; B29C 45/14065; B29C 45/14131; B29C 45/14147; B29C 45/14819
See application file for complete search history.

(56) References Cited

U.S. PATENT DOCUMENTS

| | | | |
|---|---|---|---|
| 1,352,735 | A | 9/1920 | Egerton |
| 1,775,091 | A | 9/1930 | Frank |

(Continued)

FOREIGN PATENT DOCUMENTS

| | | |
|---|---|---|
| WO | 2014149639 | 9/2014 |
| WO | 2016126451 | 8/2016 |

OTHER PUBLICATIONS

Sliger, Matthew; Issue Notification for U.S. Appl. No. 14/615,971, filed Feb. 6, 2015, dated May 10, 2017, 1 page.

(Continued)

*Primary Examiner* — Robert A Vetere
(74) *Attorney, Agent, or Firm* — Taylor English Duma LLP (57) ABSTRACT

A method of manufacturing a main valve of a hydrant includes: forming an internal rigid structure including a top surface, a bottom surface, a side surface, and a locating feature, the locating feature defined in a one of the top surface and the bottom surface; positioning the internal rigid structure in a mold by contacting the locating feature with the mold; and forming an outer shell around the internal rigid structure.

12 Claims, 6 Drawing Sheets

(51) Int. Cl.
  *E03B 9/06* (2006.01)
  *F16K 1/36* (2006.01)
  *B29K 9/06* (2006.01)
  *B29K 105/20* (2006.01)
  *B29L 31/00* (2006.01)

(56) References Cited

U.S. PATENT DOCUMENTS

| | | | |
|---|---|---|---|
| 2,250,813 | A | 7/1941 | Rea |
| 2,702,686 | A * | 2/1955 | Fortune .................. F16K 41/12 251/335.2 |
| 3,820,755 | A | 6/1974 | Greenwood et al. |
| 4,139,931 | A | 2/1979 | Royce |
| 4,303,223 | A * | 12/1981 | Whisenhunt .............. E03B 9/04 137/283 |
| 4,790,341 | A | 12/1988 | Laurel |
| 5,303,937 | A | 4/1994 | Huss et al. |
| 5,368,064 | A | 11/1994 | Kjaer |
| 5,441,074 | A | 8/1995 | Kjaer |
| 5,947,152 | A | 9/1999 | Martin et al. |
| 6,488,050 | B1 | 12/2002 | Jabcon |
| 6,886,586 | B2 | 5/2005 | Fluery |
| 7,275,732 | B2 | 10/2007 | Kato et al. |
| 9,222,582 | B2 | 12/2015 | Gifford |
| 9,476,186 | B2 | 10/2016 | Gifford |
| 9,664,297 | B2 | 5/2017 | Sliger |
| 2010/0140966 | A1 | 6/2010 | Kimball |
| 2014/0084202 | A1 | 3/2014 | Mevius |
| 2014/0261699 | A1 | 9/2014 | Gifford |
| 2016/0069050 | A1 | 3/2016 | Gifford |
| 2016/0230373 | A1 | 8/2016 | Sliger |

OTHER PUBLICATIONS

Sliger, Matthew; Notice of Allowance for U.S. Appl. No. 14/615,971, filed Feb. 6, 2015, dated Mar. 20, 2017, 14 pgs.
Sliger, Matthew; Supplemental Notice of Allowability for U.S. Appl. No. 14/615,971, filed Feb. 6, 2015, dated May 1, 2017, 6 pgs.
Gifford, Paul; Advisory Action for U.S. Appl. No. 13/836,154, filed Mar. 15, 2013, dated Apr. 14, 2015, 3 pgs.
Gifford, Paul; Corrected Notice of Allowability for U.S. Appl. No. 13/836,154, filed Mar. 15, 2013, dated Nov. 25, 2015, 4 pgs.
Gifford, Paul; Final Office Action for U.S. Appl. No. 13/836,154, filed Mar. 15, 2013, dated Feb. 6, 2015, 13 pgs.
Gifford, Paul; Issue Notification for U.S. Appl. No. 13/836,154, filed Mar. 15, 2013, dated Dec. 9, 2015, 1 pg.
Gifford, Paul; Non-Final Office Action for U.S. Appl. No. 13/836,154, filed Mar. 15, 2013, dated Sep. 30, 2014, 25 pgs.
Gifford, Paul; Non-Final Office Action for U.S. Appl. No. 13/836,154, filed Mar. 15, 2013, dated Jun. 8, 2015, 19 pgs.
Gifford, Paul; Notice of Allowance for U.S. Appl. No. 13/836,154, filed Mar. 15, 2013, dated Sep. 18, 2015, 5 pgs.
Gifford, Paul; Issue Notification for U.S. Appl. No. 14/945,960, filed Nov. 19, 2015, dated Oct. 5, 2016, 1 pg.
Gifford, Paul; Non-Final Office Action for U.S. Appl. No. 14/945,960, filed Nov. 19, 2015, dated Apr. 6, 2016, 28 pgs.
Gifford, Paul; Notice of Allowance for U.S. Appl. No. 14/945,960, filed Nov. 19, 2015, dated Jul. 1, 2016, 9 pgs.
Gifford, Paul; Supplemental Notice of Allowability for U.S. Appl. No. 14/945,960, filed Nov. 19, 2015, dated Sep. 1, 2016, 4 pgs.
Sliger, Matthew; Non-Final Office Action for U.S. Appl. No. 14/615,971, filed Feb. 6, 2015, dated Oct. 19, 2016; 40 pgs.
Sliger, Matthew; Restriction Requirement for U.S. Appl. No. 14/615,971, filed Feb. 6, 2015, dated Sep. 7, 2016; 8 pgs.
Gifford, Paul; International Preliminary Report on Patentability for PCT/US14/20063, filed Mar. 4, 2014, dated Sep. 24, 2015, 7 pgs.
Gifford, Paul; International Search Report and Written Opinion for serial No. PCT/US14/20063, filed Mar. 4, 2014, dated Jun. 23, 2014, 9 pgs.
Gifford, Paul; Applicant-Initiated Interview Summary for U.S. Appl. No. 14/945,960, filed Nov. 19, 2015, dated Jan. 26, 2016, 4 pgs.
Sliger, Matthew; International Search Report and Written Opinion for PCT Application No. PCT/US2016/014796, filed Jan. 26, 2016, dated Jun. 3, 2016, 10 pgs.
Sliger, Matthew; International Preliminary Report on Patentability for PCT Application No. PCT/US2016/014796, filed Jan. 26, 2016, dated Aug. 17, 2017, 7 pgs.
Sliger, Matthew; Applicant Initiated Interview Summary for U.S. Appl. No. 14/615,971, filed Feb. 6, 2015, dated Nov. 15, 2016, 3 pgs.

* cited by examiner

MAIN VALVE WITH GROOVED RIGID INTERNAL STRUCTURE

CROSS-REFERENCE TO RELATED APPLICATIONS

This application is a divisional of U.S. application Ser. No. 14/615,971, filed Feb. 6, 2015, which is hereby specifically incorporated by reference herein in its entirety.

TECHNICAL FIELD

This disclosure relates to valves. More specifically, this disclosure relates to main valves in a hydrant.

BACKGROUND

Valve elements are used to regulate or control the flow of material by opening, closing, or partially obstructing various passageways. One type of valve or valve element is a main valve, which can be used in a number of applications, such as within a hydrant shoe of a dry-barrel fire hydrant. Main valves in hydrants occasionally fail to seal properly or even fail catastrophically as the result of deformation or other degradation of the main valve over time. Deformation and other degradation is typically caused by the mechanical forces that act on the valve during operation including when the valve is closed or being tightened. This deformation is typically caused by the flexibility of the material, such as rubber, used to make the valve or by the material of the outer portion of the valve that comes into contact with the hydrant in cases where the valve has an internal rigid structure formed from a different material. While incorporating an internal rigid structure in a valve can improve the performance and durability of the valve, problems associated with incorporating such structure include the difficulty in centering the structure and holding the structure in place during the manufacturing process, the difficulty in maintaining a consistent shell thickness around the structure, and corrosion of the rigid structure due to exposure to water necessitated by the design of the valve or the process for manufacturing the valve.

SUMMARY

Disclosed is a main valve for a hydrant including an internal rigid structure including a top surface, a bottom surface, and a locating feature, the locating feature defined in a one of the top surface and the bottom surface; and an outer shell at least partially enclosing the internal rigid structure and interacting with the locating feature.

Also disclosed is a hydrant including a hydrant body defining an inlet and an outlet, the inlet connectable to a fluid supply; and a main valve having an internal rigid structure and an outer shell at least partially enclosing the internal rigid structure, the main valve coupled to the hydrant body and mountable between the outlet of the hydrant body and the fluid supply, the outlet of the hydrant body sealable by the main valve, the internal rigid structure including a top surface, a bottom surface, a side surface, and a locating feature, the locating feature interacting with the outer shell.

Also disclosed is a method of manufacturing a main valve of a hydrant including forming an internal rigid structure including a top surface, a bottom surface, a side surface, and a locating feature, the locating feature defined in a one of the top surface and the bottom surface; positioning the internal rigid structure in a mold by contacting the locating feature with the mold; and forming an outer shell around the internal rigid structure.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Disclosed is a main valve and associated methods, systems, devices, and various apparatus. The main valve includes an internal rigid structure. Exemplary main valves are shown and disclosed in U.S. Pat. No. 6,886,586 to Fleury, et al. and in U.S. Patent Publication No. 2014/0261699 to Gifford, both of which are hereby incorporated by reference in their entireties. It would be understood by one of skill in the art that the disclosed main valve is described in but a few exemplary embodiments among many. No particular terminology or description should be considered limiting on the disclosure or the scope of any claims issuing therefrom.

Figure 1:
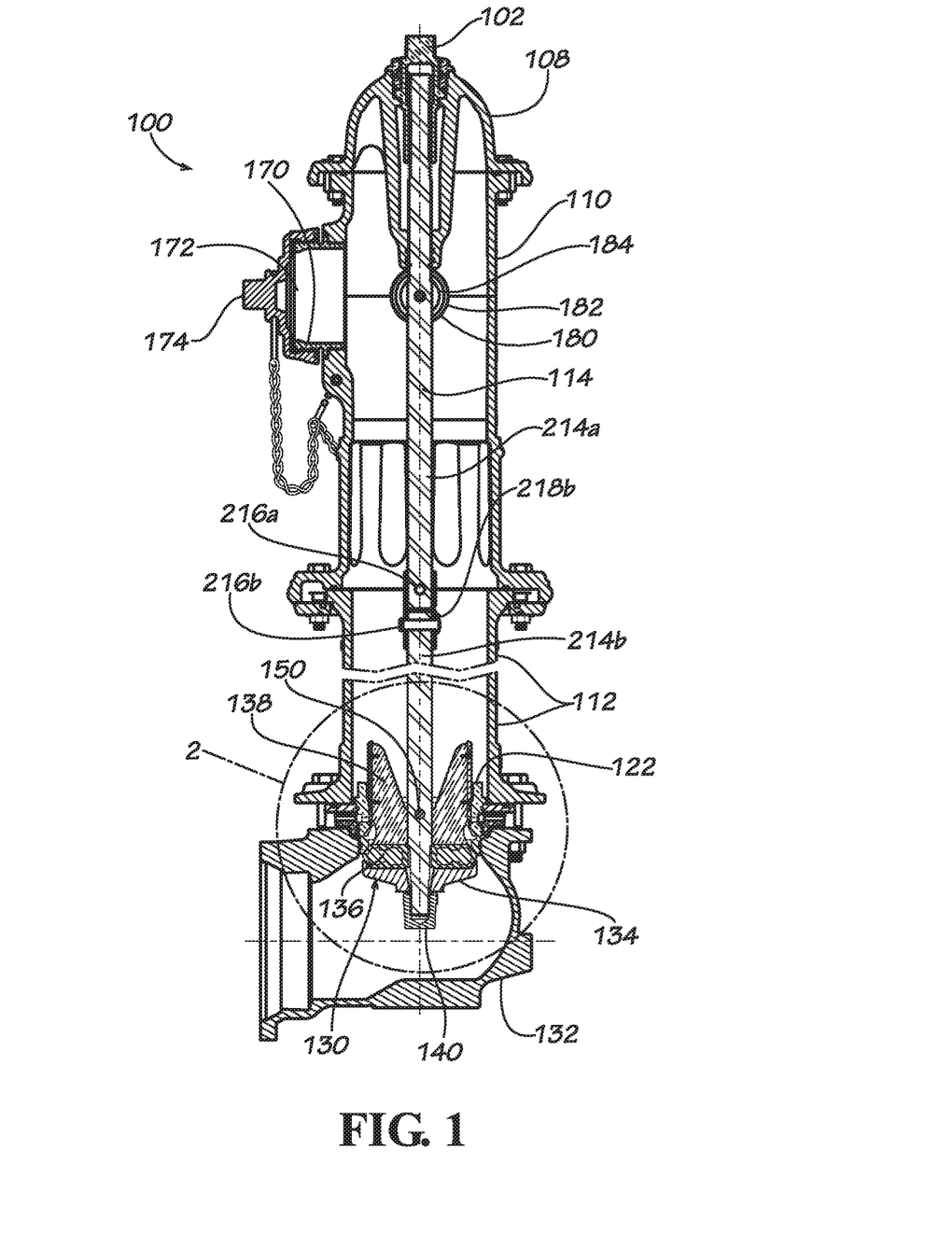
FIG. 1 is a sectional view of a hydrant in accordance with one embodiment of the current disclosure including an upper barrel, a lower barrel, a hydrant shoe, and a valve assembly.

One embodiment of a main valve 136 mounted in a hydrant 100 is shown in FIG. 1 and described below. In the current embodiment, the hydrant 100 is a dry-barrel fire hydrant having a hydrant body 110, a bonnet 108 connected to the top of hydrant body 110, a lower barrel 112 connected to the bottom of hydrant body 110, and a hydrant shoe 132 connected to the bottom of lower barrel 112. In various embodiments, the hydrant shoe 132 of the hydrant 100 may be connected to a water supply pipe or any other fluid supply pipe. In various embodiments, hydrant 100 may be other types of fire hydrants, such as a wet-barrel fire hydrant, and the disclosure of a dry-barrel fire hydrant should not be considered limiting. In the current embodiment, an operating nut 102 is mounted on the bonnet 108 and has a threaded connection (not shown) with a stem 114. Stem 114 includes upper stem portion 214a and lower stem portion 214b in the current embodiment connected by a pair of clevis pins 216a,b having cotter pins 218a,b, respectively. In various other embodiments, the upper stem portion 214a and lower stem portion 214b may be connected by any fastener in various embodiments, including welding, screws, or bolts, and the stem 114 may be a single unit in various embodiments.

In the current embodiment, a valve assembly 130 is coupled to the lower stem portion 214b. The valve assembly 130 includes a main valve 136, an upper valve plate 138, and a lower valve plate 134. In various embodiments, the valve assembly 130 is coupled to the lower stem portion 214b by a cap nut 140 and a stem pin 150. The cap nut 140 is connected to the lower stem portion 214b in the current embodiment by threading 240. The stem pin 150 extends through the lower stem portion 214b and connects with upper valve plate 138. The main valve 136, the upper valve plate 138, and the lower valve plate 134 are thereby held between the stem pin 150 and the cap nut 140. In various other embodiments, the valve assembly 130 may be mounted to the stem 114 by other methods including fasteners, brackets, threading on the upper valve plate 138 or the lower valve plate 134, welding, or gluing. In various other embodiments, the upper valve plate 138 or the lower valve plate 134 may be formed integrally with stem 114. The present disclosure of a stem pin 150 and a cap nut 140 should not be considered limiting.

In the current embodiment, the hydrant body 110 includes a pumper nozzle 170 defining a pumper nozzle outlet 172 and a hose nozzle 180 defining a hose nozzle outlet 182. The pumper nozzle outlet 172 is covered by a pumper nozzle cap 174 and the hose nozzle outlet 182 is covered by a hose nozzle cap 184. Pumper nozzle cap 174 and hose nozzle cap 184 are removable for attachment of a pumper and a hose, respectively, to the hydrant 100.

Figure 2:
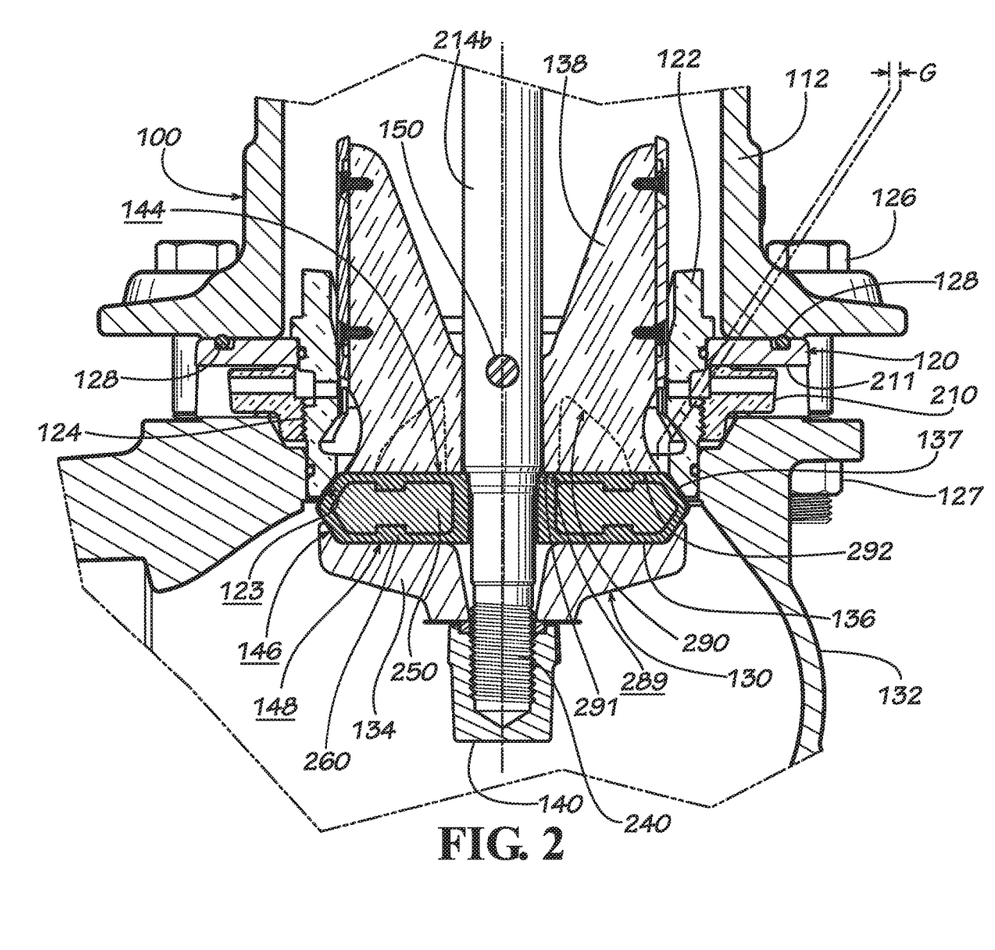
FIG. 2 is a detailed sectional view of the lower barrel, the hydrant shoe, and the valve assembly of the hydrant of FIG. 1 taken from detail circle 2 in FIG. 1.

As seen in FIG. 2, a drain ring housing 120 is secured between lower barrel 112 and hydrant shoe 132 via a bolt 126—and also nut 127 in various embodiments—and is sealed with respect to lower barrel 112 using a gasket 128. The drain ring housing 120 may be secured by other methods in different embodiments, such as gluing, welding, brackets, or other fasteners. In various embodiments, drain ring housing 120 includes a first housing 210 and a second housing 211. A seat ring 122 is threadedly engaged to an interior portion of drain ring housing 120 through a threaded connection 124. Seat ring 122 has a beveled seating surface 123 defined in an interior portion thereof for sealing against main valve 136. Main valve 136 (shown in more detail in FIGS. 3-4) includes a side surface 146, a top surface 144, and a bottom surface 148. In various embodiments, "surface" is intended to encompass three-dimensional surfaces such as the surface of a golf ball or the side surface 146 of the main valve 136 and not just flat or planar surfaces. In various embodiments, the top surface 144 does not include surfaces which in the current are described as a side surface such as the side surface 146. In various other embodiments, the top surface 144 or the bottom surface 148 include angled or beveled surfaces that extend from radially inward or outward portions of the axially outermost portions of the top surface 144 or the bottom surface 148. Unless otherwise specified, a surface or other feature that is 'angled' is one that intersects with a neighboring feature at an angle between zero and 180 degrees.

In the current embodiment, the upper valve plate 138 contacts the top surface 144 and the lower valve plate 134 contacts the bottom surface 148. The side surface 146 defines a first beveled portion 137 disposed between the bottom surface 148 and the top surface 144. In various embodiments, the upper valve plate 138 defines a hollow cavity 290. In various embodiments, upper valve plate 138 defines a plurality of hollow cavities 290. In various embodiments, the upper valve plate 138 defines a lower surface 289 through which hollow cavity 290 extends. In various embodiments, a radially-outward portion 292 of lower surface 289 of upper valve plate 138 supports a radially-outward portion of top surface 144 of main valve 136 and a radially-inward portion 291 of lower surface 289 supports select radially-inward portions of main valve 136. In various embodiments, less than the entire top surface 144 of main valve 136 is supported by upper valve plate 138. In various embodiments, less than the entire bottom surface 148 of main valve 136 is supported by lower valve plate 134. Due to the rigidity provided to main valve 136 by internal rigid structure 250, supporting the entire top surface 144 or the entire bottom surface 148 of main valve 136 is not necessary in various embodiments because the main valve 136 is able to resist deformation, including where portions of main valve 136 are not in direct contact with upper valve plate 138 or lower valve plate 134. Moreover, the presence of internal rigid structure 250 inside main valve 136 helps prevent main valve 136 from being pulled up into seat ring 122 and into lower barrel 112.

In operation in the current embodiment, to allow water to flow from the water supply pipe to the hydrant body 110, operating nut 102 is turned in one direction, lowering stem 114 and thereby causing lower valve plate 134 to urge main valve 136 away from seat ring 122 such that first beveled portion 137 disengages from beveled seating surface 123. To discontinue water flowing from the water supply pipe to the hydrant body 110, operating nut 102 is turned in the opposite direction, raising stem 114 and thereby causing lower valve plate 134 to urge main valve 136 towards seat ring 122 such that first beveled portion 137 engages beveled seating surface 123. The hose nozzle outlet 182 and the pumper nozzle outlet 172 are thereby at least indirectly sealable by main valve 136.

Figure 3:
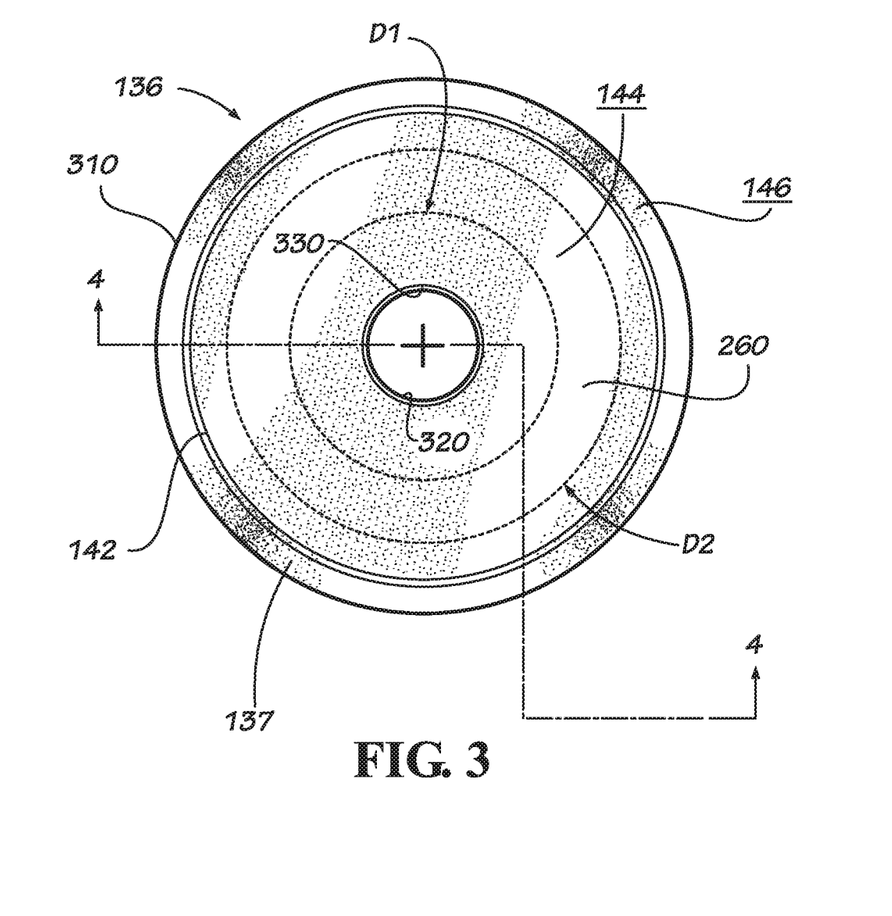
FIG. 3 is a top view of a main valve of the valve assembly of FIG. 2.

FIG. 2 also shows that main valve 136 includes an internal rigid structure 250 enclosed within an outer shell 260. In various embodiments, the outer shell 260 is formed from a flexible, water-impervious material such as rubber or plastic. Further, in various embodiments, the internal rigid structure 250 is formed from a rigid material such as cast iron, hard plastic, stainless steel, or other materials having similar mechanical properties. However, the disclosure of cast iron, hard plastic, and stainless steel should not be considered limiting on the current disclosure. The internal rigid structure 250 may be a solid piece or a hollow shell in various embodiments. In the current embodiment, the internal rigid structure 250 is a solid piece and has a top profile that is ring-shaped (as shown in FIG. 3). In various embodiments, the internal rigid structure 250 may include one or more ring portions. In various embodiments, the internal rigid structure 250 may have a top profile shaped like a square, pentagon, hexagon, octagon, or any other shape. In various embodiments, the main valve 136 defines a bore 320 (shown in FIGS. 3-4) through the center of the main valve 136. In various embodiments, bore 320 includes a radiused portion 330 and a radiused portion 340 having a radius R42 and a radius R43, respectively. In various other embodiments, the main valve 136 may not define a bore 320 through the center of the main valve 136 where the stem shown in the current embodiment as stem 114 does not pass through main valve 136. Further, in various embodiments, the internal rigid structure 250 may not be fully enclosed by outer shell 260 but may be only partially enclosed.

In various embodiments, the first beveled portion 137 of main valve 136 allows a sufficient seal to develop between first beveled portion 137 and a beveled seating surface 123 of seat ring 122 at a smaller diameter, thus providing a higher leak point. Therefore, a greater amount of force per unit area is applied at the interface between seat ring 122 and main valve 136. As a result, sealing may be accomplished with less total force and less deformation of main valve 136. Moreover, plastic creep of outer shell 260 into the gap G between upper valve plate 138 and seat ring 122 may not occur because angle B (shown in FIG. 4) between first beveled portion 137 and second beveled portion 142 (shown in FIG. 4) reduces the diameter of main valve 136 immediately adjacent to gap G, advantageously extending the life of the main valve 136. As is described below, the same benefit is provided with respect to the bottom portion if/when the main valve 136 is 'flipped' in service.

Figure 4:
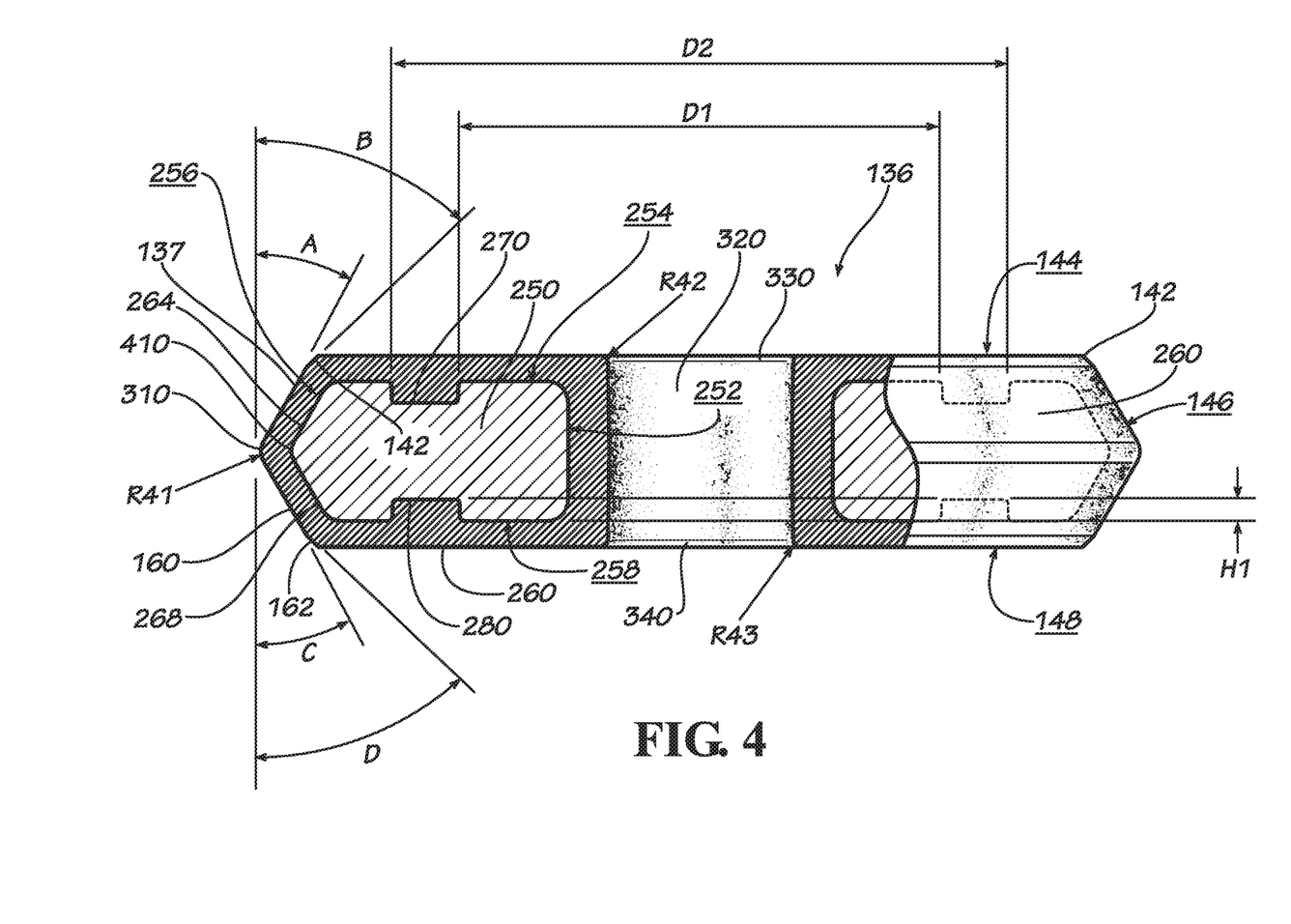
FIG. 4 is a partial sectional side view of the main valve of FIG. 3 taken along line 4-4 in FIG. 3.

FIGS. 3 and 4 show a top view and a partial sectional view, respectively, of the main valve 136. In the current embodiment, side surface 146, top surface 144, and bottom surface 148 are defined on outer shell 260. As seen in FIGS. 3 and 4, the side surface 146 of main valve 136 defines a first beveled portion 137, a second beveled portion 142, a third beveled portion 160, a fourth beveled portion 162, and a radially outermost edge 310. In various embodiments, the radially outermost edge 310 is rounded with radius R41 around the perimeter of main valve 136. As shown in FIG. 4, the first beveled portion 137 extends from a radially outermost edge 310 of side surface 146 to a second beveled portion 142 substantially at an angle A and second beveled portion 142 extends from first beveled portion 137 to top surface 144 substantially at an angle B, wherein angle B is larger than angle A. First beveled portion 137 provides a seating portion while the second beveled portion 142 represents additional material missing that limits creep and deformation to extend the useful life of the main valve 136 and better seating and sealing over the useful life of the valve assembly 130. In various embodiments, the second beveled portion 142 may be achieved by creating a radius between the first beveled portion 137 and the top surface 144.

As shown in FIG. 4, the third beveled portion 160 extends from radially outermost edge 310 to fourth beveled portion 162 at an angle C and fourth beveled portion 162 extends from third beveled portion 160 to bottom surface 148 substantially at an angle D, wherein angle D is larger than angle C. In various embodiments, the fourth beveled portion 162 may be achieved by creating a radius between the third beveled portion 160 and the bottom surface 148.

In the current embodiment, angle C is approximately equal to angle A and angle D is approximately equal to angle B, though angles A and C and/or angles B and D, respectively, may be different from each other in various embodiments. Thus, in the current embodiment the top portion of main valve 136, defined from the radially outermost edge 310 to and inclusive of the top surface 144 and including the portion of side surface 146 therebetween, is substantially identical to the bottom portion of main valve 136 defined from the radially outermost edge 310 to and inclusive of the bottom surface 148 and including the portion of side surface 146 therebetween. As a result, in various embodiments the main valve is symmetrical about a horizontal plane perpendicular to an axis of the main valve. This allows main valve 136 to be reversible such that if the top portion or upper half of main valve 136 becomes damaged or fatigued, main valve 136 may be 'flipped' over such that the third beveled portion 160 of main valve 136 may be used to form a seal with beveled seating surface 123. Thus, reversible main valve 136 with improved sealing affords the ability to affect a repair even when a replacement part is not available. The matching contours of the top portion and bottom portion of main valve 136 may therefore facilitate more resilient and better sealing.

Further, as shown in FIG. 4, in the current embodiment, internal rigid structure 250 defines an inner surface 252, a top surface 254, a bottom surface 258, and a side surface 256. In the current embodiment, side surface 256 defines a radially outermost edge 410, a first angled portion 264 extending from radially outermost edge 410 to top surface 254, and a second angled portion 268 extending from radially outermost edge 410 to bottom surface 258. In the current embodiment, first angled portion 264 has a first angle that is approximately equal to a second angle of second angled portion 268, though the first angle and the second angle may not be equal in various embodiments. In addition, radially outermost edge 410 of internal rigid structure 250, in the current embodiment, is approximately coplanar with radially outermost edge 310 of main valve 136, though radially outermost edge 410 may not be coplanar with radially outermost edge 310 in various embodiments.

Figure 5:
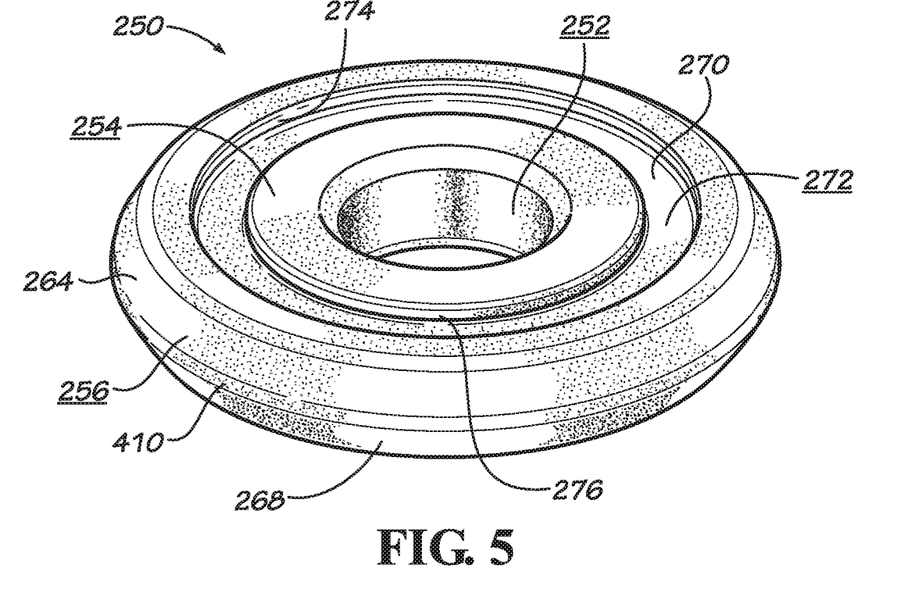
FIG. 5 is a perspective view of an internal rigid structure of the main valve of FIG. 3.

FIG. 4 also shows the internal rigid structure 250 including a locating feature 270 defined in an axially outermost portion of top surface 144 and a locating feature 280 defined in an axially outermost portion of bottom surface 148. In various embodiments, locating features 270,280 are described as annular grooves. In various embodiments, locating features can be shaped as any one or more of a group of recessed or protruding features in internal rigid structure 250 including, but not limited to, grooves, holes including center-punched holes, channels, cavities, slots or elongated holes, divots, pins, bosses with or without internal recesses, and recessed features that extend from a radially outer wall of the feature to the axial center of internal rigid structure 250. In various embodiments, locating features 270,280 of internal rigid structure 250 are at least partially in contact with outer shell 260. In various embodiments, locating features 270,280 aid in positioning internal rigid structure 250 relative to outer shell 260 during the manufacturing process. FIG. 5 discloses a perspective view of the internal rigid structure 250. Locating feature 270 defined in the axially outermost portion of top surface 254 is shown with a first side wall 276 and a second side wall 274, both extending from and angled with respect to the axially outermost portion of top surface 254. In various embodiments, the first side wall 276 and the second side wall 274 are orthogonal to the axially outermost portion of top surface 254. In various embodiments, the top surface 254 of internal rigid structure 250 defines locating feature 270 including a locating feature bottom surface 272. In various embodiments, the bottom surface 258 defines locating feature 280 including a locating feature bottom surface 282 (both shown in FIG. 7). In various embodiments, the intersection between locating feature bottom surface 272 and second side wall 274 or first side wall 276 of locating feature 270 includes a radius. In various embodiments, the intersection between locating feature bottom surface 282 and one or more side walls (not shown) of locating feature 280 includes a radius.

In addition, in the current embodiment, internal rigid structure 250 provides support to outer shell 260 such that main valve 136 is capable of withstanding higher operating pressures than main valves lacking internal rigid structure 250, such as solid rubber main valves. Further, internal rigid structure 250 prevents main valve 136 from plastic creep occurring into gap G between upper valve plate 138 and seat ring 122 because the rigidity provided by internal rigid structure 250 reduces the volume of flexible material in main valve 136 and therefore the volume of material that can deform (shown in FIG. 7, height H3 is typical of the thickness of the flexible material from which outer 260 is formed) just as it reduces the degree of deformation that is physically possible into gap G. In the current embodiment, first angled portion 264 provides support to first beveled portion 137 and second beveled portion 142, and second angled portion 268 provides support to third beveled portion 160 and fourth beveled portion 162. However, first angled portion 264 and second angled portion 268 may not be present in various embodiments, and internal rigid structure 250 may be included in various main valves not including any of first beveled portion 137, second beveled portion 142, third beveled portion 160, and fourth beveled portion 162.

In various embodiments, an overall thickness (as measured from top surface 254 to bottom surface 258) and an overall diameter (measured to radially outermost edge 410) of the internal rigid structure 250 is a substantial percentage of an overall thickness (as measured from top surface 144 to bottom surface 148) and an overall diameter (measured to radially outermost edge 310), respectively, of the main valve 136, causing the internal rigid structure 250 to occupy most of the volume of the main valve 136 and causing outer shell 260 to be relatively thin in proportion to the thickness of internal rigid structure 250. In various embodiments, the outer shell 260 is less rigid and more deformable than internal rigid structure 250; therefore, in various embodiments the thinness of outer shell 260 minimizes the overall deformation of the main valve 136 or a particular portion thereof. In various embodiments, the thinness of outer shell 260 minimizes material costs for the outer shell 260 and is another reason to center internal rigid structure 250 in main valve 136. In various embodiments, an internal rigid structure 250 that is not centered in main valve 136 will result in greater variation in the thickness of outer shell 260 in different portions of the main valve 136 when outer shell 260 is relatively thin in proportion to the thickness of internal rigid structure 250 than when outer shell 260 is thicker. In various embodiments, the overall thickness and overall diameter of the internal rigid structure 250 is greater than 50%, 75%, 80%, 90%, or as much as 95% or more of the overall thickness and overall diameter, respectively, of the main valve 136, to reduce the thickness of outer shell 260.

Figure 6:
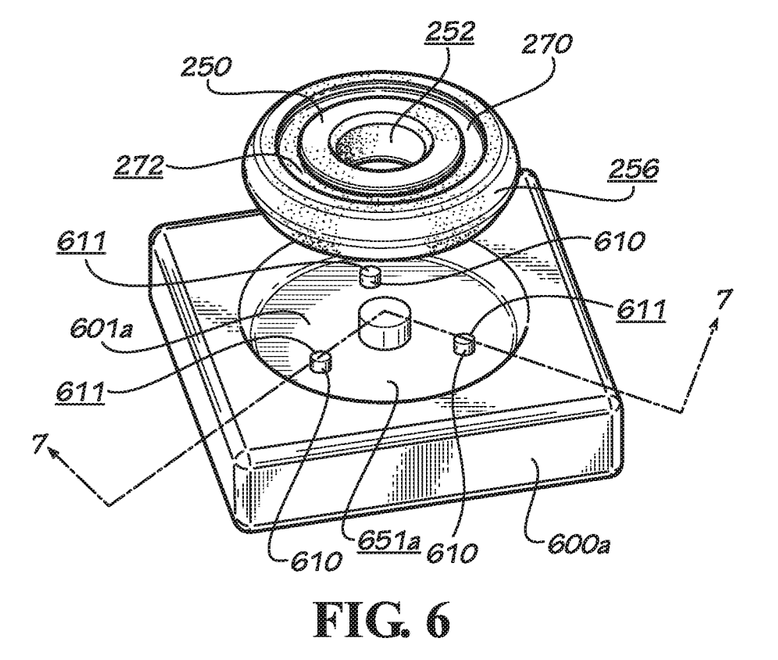
FIG. 6 is a perspective view of the internal rigid structure of FIG. 5 shown with one half of a mold for molding the main valve of FIG. 3.

FIG. 6 shows the internal rigid structure 250 together with a lower mold half 600a, lower mold half 600a including a plurality of locating pins 610, each with an axial end surface 611. Lower mold half 600a is sized not to match the dimensions of internal rigid structure 250 but rather to match the outer dimensions of main valve 136, which is molded using a mold 600 (shown in FIG. 7) which includes lower mold half 600a in various embodiments. In various embodiments, lower mold half 600a includes three locating pins 610, each attached to lower mold half 600a and positioned radially equidistant from the center of a cavity 601a in lower mold half 600a used to form the shape of at least one half of main valve 136. In various embodiments, a center of each of the plurality of locating pins 610 lies within a circle having a radius (not shown) equal to that in which the axial center line of locating features 270 or locating feature 280 also lies. In various embodiments, this radius is half of the average of diameters D1 and D2 shown in FIGS. 3 and 4.

Figure 7:
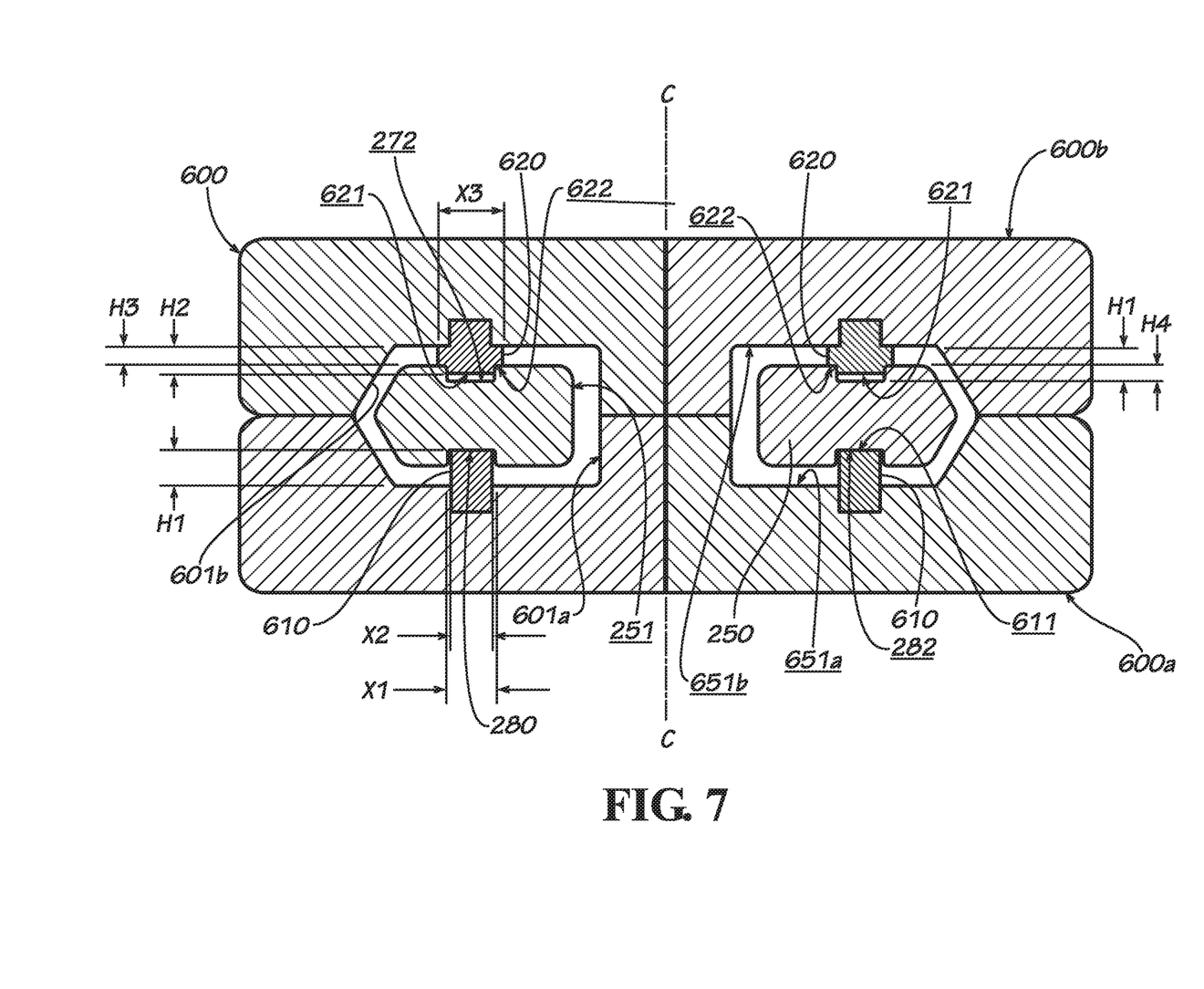
FIG. 7 is a sectional side view of the internal rigid structure of FIG. 5 taken along line 7-7 in FIG. 6 showing inside both halves of a mold for molding the main valve of FIG. 3.

FIG. 7 shows the internal rigid structure 250 sandwiched between the lower mold half 600a and an upper mold half 600b. Upper mold half 600b, like lower mold half 600a, is sized not to match the dimensions of internal rigid structure 250 but rather to match the outer dimensions of main valve 136, which is molded using the mold 600 resembling, at least in part, lower mold half 600a and upper mold half 600b in combination in various embodiments. The disclosure of mold 600, however, should not be considered limiting because the mold used to produce main valve 136 as disclosed may differ in appearance from that shown in the current embodiment and may include additional features not explicitly disclosed herein, including but not limited to any channels or ports for introducing molten raw material into the mold, heating or cooling features, ejector pins, features for locating each of the mold halves with respect to the injection molding machine, and the like.

In various embodiments, upper mold half 600b includes a plurality of locating pins 620. In various embodiments, upper mold half 600b includes three locating pins 612, each attached to upper mold half 600b and positioned radially equidistant from the center C of cavity 601b in upper mold half 600b used to form the shape of the other half of main valve 136. In various embodiments, locating pins 610 each have an outer diameter X2, and the axial end surface 611 of each locating pin 610 is positioned a distance equal to a height H1 away from an axially outermost portion of a surface 651a of lower mold half 600a. In various embodiments, locating pins 620 each have a first outer diameter X1, a second outer diameter X3, a first axial end surface 621, and a second axial end surface 622. In various embodiments, the first axial end surface 621 is positioned a distance equal to a height H2 away from an axially outermost portion of a surface 651b of upper mold half 600b, and the second axial end surface 622 is positioned a distance equal to a height H3 away from the axially outermost portion of surface 651b of upper mold half 600b. The distance between the first side wall 276 and the second side wall 274 of the locating features 270,280 is the distance X1, although in various embodiments the distance is slightly greater than distance X1 in order to allow for variation in the diameter X2 of locating pin 610 or to allow for variation in the diameter X1 of locating pins 620. In various embodiments, X3 is larger than X2. In various embodiments, a center of each of the plurality of locating pins 620 lies within a circle having a radius equal to that in which the axial center line of locating features 270,280 also lies. In various embodiments, this radius is half of the average of diameters D1 and D2 shown in FIGS. 3 and 4.

Therefore, in various embodiments locating pins 610 and locating pins 620 fit into locating features 270,280. In various embodiments, it may be advantageous to reference or gauge from the bottom of locating features 270,280 and therefore use locating pins 610. In various embodiments, the axial end surface 611 of each of locating pins 610 comes into mating contact with locating feature bottom surface 282 of locating feature 280 of internal rigid structure 250. In various embodiments, the circumferential edge of axial end surface 611 of each of locating pins 610 includes a radius to improve the ease of which locating pins 610 fit into locating features 270,280 or else to accommodate radii at the bottom of locating features 270,280. In various embodiments, the diameter of each of the locating pins 610 is reduced to approximately match that portion of locating feature bottom surfaces 272,282 that is flat so that the axial end surface 611 of locating pin 610 remains in mating contact with locating feature bottom surface 282. While locating pins 610 and locating pins 620 are sized differently, at least in part, both locating pins 610 and locating pins 620 or any combination thereof and also variations thereof are able to hold internal rigid structure 250 in the proper position but by referencing different surfaces of internal rigid structure 250 in various embodiments.

In various embodiments, the internal surfaces of locating features 270,280 may be more difficult to clean of foreign matter during the manufacturing process than the axially outermost portion of either top surface 254 or bottom surface 258 of internal rigid structure 250 and so it is preferable to reference or gauge from the axially outermost portion of either top surface 254 or bottom surface 258 of internal rigid structure 250 and therefore use locating pins 620. More specifically, the second axial end surface 622 of each of locating pins 620 comes into mating contact with bottom surface 258 of internal rigid structure 250 in various embodiments. In various embodiments, the circumferential edge of the first axial end surface 621 or the second axial end surface 622 of each of the locating pins 620 will each include a radius to improve the ease of which locating pins 620 fit into locating features 270,280. In various embodiments, this radius on the circumferential edge of the first axial end surface 621 or the second axial end surface 622 of each of the locating pins 620 accommodates a radius between the axially outermost portion of top surface 254 and locating feature 270 or between the axially outermost portion of bottom surface 258 and locating feature 280. In various embodiments, the diameter at the end of each of the locating pins 620 is tapered to improve the ease of which locating pins 620 fit into locating features 270,280. In various embodiments, the taper will result in the diameter of locating pin 620 being greater at the intersection with the second axial end surface 622 than the diameter of locating pin 620 at the intersection with the first axial end surface 621. In various embodiments, the locating pins of mold 600 are conical or frustoconical with annular groove having a matching cross-section—i.e. having walls that include a draft angle or having side walls otherwise angled at an angle other than 90 degrees from the top surface 254 or bottom surface 258. In various other embodiments, the locating pins are not conical or frustoconical in shape. In various embodiments, the locating pins are axially symmetric. In various embodiments, the side walls are symmetrical about an axial centerline of the annular groove to accommodate locating pins that are axially symmetric. In various embodiments, symmetry of the annular groove or the locating pins means that orienting the locating pins in mold 600 in any particular rotational position is unnecessary for purposes of matching the profile of the locating features. In various embodiments, bore 320 serves as a locating feature to accommodate one or more locating pins (not shown) to fix and maintain the position of internal rigid structure 250 during the encapsulation process.

Also disclosed is a method of manufacturing the main valve 136 of the hydrant 100 with the internal rigid structure 250. In various embodiments, the method includes positioning the internal rigid structure 250 in mold 600—including lower mold half 600a and upper mold half 600b in various embodiments. In various embodiments, the method includes the step of engaging the locating feature 270 or 280 with one or more locating pins 610 or 620. In various embodiments, this method includes contacting the locating feature 270,280 of internal rigid structure 250 with the mold 600. In various embodiments, the method includes positioning the internal rigid structure 250 so as to maintain the position of the internal rigid structure 250 in three spatial dimensions relative to a cavity 601 of mold 600. In various embodiments, the method includes centering the internal rigid structure 250 inside the cavity 601 of mold 600. In various embodiments, the method includes forming an outer shell 260 at least partially around the internal rigid structure 250. In various embodiments, the method includes forming the outer shell 260 around the internal rigid structure 250 so as to fully enclose the internal rigid structure 250 within the outer shell 260. In various embodiments, the method includes forming the outer shell 260 around the internal rigid structure 250 so as to fill the space between cavity 601—which defines surface 651a of cavity 601a and surface 651b of cavity 601b—and the surface 251 of internal rigid structure 250. In various embodiments, the outer shell 260 is formed with a flexible material defining a Shore-A durometer which is less than about 100, although the disclosure of a Shore-A durometer of less than about 100 should not be considered limiting on the present disclosure. In various embodiments, the Shore-A durometer of the material used in the outer shell 260 is about 95. In various embodiments, the outer shell 260 is formed from styrene-butadiene rubber. However, the disclosure of styrene-butadiene rubber should not be considered limiting on the present disclosure. In various embodiments, the method will include filling voids created in the outer shell 260 of main valve 136 by locating pins 610,620. In various embodiments, those voids will be filled with any one of a variety of materials including, but not limited to, epoxy, silicone, or rubber.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment. Moreover, unless specifically stated any use of the terms first, second, top, bottom, upper, lower, etc. do not denote any order or importance or absolute positioning, but rather the terms first, second, top, bottom etc. are used to distinguish one element from another. Further, the size, shape, thickness, and other dimensions and features of the various components shown in the figures are for illustrative purposes and should not be considered limiting. The drawings are not drawn to scale.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the That which is claimed is:

1. A method of manufacturing a main valve of a hydrant comprising:
   forming an internal rigid structure including a top surface, a bottom surface, a side surface, and a locating feature, the locating feature defined in a one of the top surface and the bottom surface;
   positioning the internal rigid structure in a mold by contacting the locating feature with the mold; and
   forming an outer shell around the internal rigid structure.

2. The method of claim 1, wherein the top surface and the bottom surface each define outermost portions that are substantially parallel to each other.

3. The method of claim 1, wherein positioning the internal rigid structure includes maintaining the position of the internal rigid structure in three spatial dimensions relative to the outer shell.

4. The method of claim 3, wherein positioning the internal rigid structure includes centering the internal rigid structure inside the outer shell.

5. The method of claim 3, further comprising axially engaging the locating feature with a locating pin, the locating pin attached to the mold.

6. The method of claim 5, wherein the mold includes a first mold half and a second mold half, the first mold half including a first locating pin attached to the first mold half and the second mold half including a second locating pin attached to the second mold half.

7. The method of claim 5, wherein the mold includes a first mold half and a second mold half, the first mold half including three locating pins.

8. The method of claim 1, wherein forming the outer shell around the internal rigid structure includes fully enclosing the internal rigid structure within the outer shell.

9. The method of claim 1, further comprising forming the outer shell with a flexible material defining a Shore-A durometer that is less than about 100.

10. The method of claim 9, wherein the flexible material is styrene-butadiene rubber.

11. The method of claim 1, wherein the locating feature is a one of a recessed feature and a protruding feature.

12. The method of claim 1, wherein each of the locating features is a one of a groove, a hole, a channel, a cavity, a slot, a divot, pin, and a boss.

* * * * *